US012679755B2

(12) United States Patent
Wang et al.

(10) Patent No.: US 12,679,755 B2
(45) Date of Patent: ***Jul. 14, 2026

(54) SELECTIVE CHEMICAL FINING OF SMALL BUBBLES IN GLASS

(71) Applicant: Owens-Brockway Glass Container Inc., Perrysburg, OH (US)

(72) Inventors: Zhongming Wang, Ypsilanti, MI (US); Scott Weil, Perrysburg, OH (US); Roger P. Smith, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/350,741

(22) Filed: Jul. 11, 2023

(65) Prior Publication Data

US 2023/0348307 A1 Nov. 2, 2023

Related U.S. Application Data

(63) Continuation of application No. 16/590,072, filed on Oct. 1, 2019, now Pat. No. 11,697,608.

(51) Int. Cl.
*C03B 5/225* (2006.01)
*C03C 1/00* (2006.01)
*C03C 3/078* (2006.01)

(52) U.S. Cl.
CPC .............. *C03B 5/225* (2013.01); *C03C 1/004* (2013.01); *C03C 3/078* (2013.01)

(58) Field of Classification Search
None
See application file for complete search history.

(56) References Cited

U.S. PATENT DOCUMENTS 1,923,221 A 8/1933 Locke et al.
4,028,131 A * 6/1977 Pons .......................... C03C 1/00
501/29

(Continued)

FOREIGN PATENT DOCUMENTS

DE 2347819.5 9/1973
DE 4207059 C1 10/1993

(Continued)

OTHER PUBLICATIONS

PCT International Search Report and Written Opinion, Int. Serial No. PCT/US2020/053396, Int. Filing Date: Sep. 30, 2020, Applicant: Owens-Brockway Glass Container Inc., Mail Date: Dec. 8, 2020.

(Continued)

*Primary Examiner* — Jodi C Franklin

(57) ABSTRACT

A method of fining glass is disclosed that includes flowing a molten glass bath through a fining chamber. The molten glass bath has an undercurrent that flows beneath a skimmer that is partially submerged in the molten glass bath. One or more fining agents are introduced into the undercurrent of the molten glass bath directly beneath the skimmer from a carrier gas. In this way, the fining agent(s) may selectively target the gas bubbles drawn under the skimmer within the undercurrent of the molten glass bath for removal. The method may be employed to fine molten glass produced in a submerged combustion melter. A fining vessel for fining molten glass is also disclosed.

20 Claims, 4 Drawing Sheets

(56)                   References Cited

U.S. PATENT DOCUMENTS

| | | | |
|---|---|---|---|
| 4,313,747 A * | 2/1982 | Barton | C03C 1/004 65/27 |
| 4,632,687 A * | 12/1986 | Kunkle | C03B 5/14 65/335 |
| 5,006,144 A | 4/1991 | Knavish et al. | |
| 5,100,453 A * | 3/1992 | Richards | C03B 5/0272 65/335 |
| 5,395,806 A * | 3/1995 | Adams, Jr. | C03C 1/004 423/430 |
| 5,509,951 A * | 4/1996 | Baucke | C03B 5/193 65/134.9 |
| 5,665,137 A * | 9/1997 | Huang | C03B 5/225 65/135.1 |
| 5,785,726 A | 7/1998 | Dorfeld et al. | |
| 5,922,097 A | 7/1999 | Kobayashi et al. | |
| 6,318,126 B1 * | 11/2001 | Takei | C03B 5/2252 65/134.2 |
| 6,401,492 B1 * | 6/2002 | Nattermann | B01D 19/0042 65/346 |
| 6,460,376 B1 | 10/2002 | Jeanvoine et al. | |
| 6,698,244 B1 * | 3/2004 | Romer | C03B 5/44 65/135.2 |
| 6,769,272 B2 | 8/2004 | Roeth et al. | |
| 6,789,396 B2 * | 9/2004 | Olin-Nunez | C03B 5/237 65/374.13 |
| 8,973,405 B2 | 3/2015 | Charbonneau et al. | |
| 9,096,452 B2 | 8/2015 | Charbonneau et al. | |
| 9,145,319 B2 | 9/2015 | Mobley et al. | |
| 9,533,905 B2 | 1/2017 | Charbonneau et al. | |
| 9,637,406 B2 * | 5/2017 | Dewet-Smith | C03B 5/173 |
| RE46,462 E | 7/2017 | Huber et al. | |
| 9,776,904 B2 * | 10/2017 | Gullinkala | C03B 5/2257 |
| 9,856,958 B2 | 1/2018 | Basin et al. | |
| 9,932,258 B1 * | 4/2018 | Clark | C03B 7/07 |
| 10,081,563 B2 | 9/2018 | Baker et al. | |
| 10,144,666 B2 | 12/2018 | Baker et al. | |
| 10,815,142 B2 | 10/2020 | Wang et al. | |
| 11,319,235 B2 * | 5/2022 | Wang | C03C 1/04 |
| 11,697,608 B2 * | 7/2023 | Wang | C03B 5/2356 65/134.5 |
| 2002/0162358 A1 | 11/2002 | Jeanvoine et al. | |
| 2004/0018934 A1 * | 1/2004 | Ott | C03C 1/004 501/67 |
| 2005/0209083 A1 | 9/2005 | Takagi et al. | |
| 2006/0105899 A1 | 5/2006 | Jacques et al. | |
| 2006/0174655 A1 * | 8/2006 | Kobayashi | C03B 5/225 65/134.5 |
| 2006/0266080 A1 * | 11/2006 | Pelton | C03B 5/193 65/157 |
| 2007/0004578 A1 | 1/2007 | Monique Comte | |
| 2007/0207912 A1 * | 9/2007 | Hulme | C03C 1/004 501/65 |
| 2009/0038342 A1 * | 2/2009 | Pitbladdo | C03B 5/262 65/165 |
| 2009/0235694 A1 * | 9/2009 | Miyazaki | C03B 5/182 65/346 |
| 2009/0277227 A1 * | 11/2009 | Pedeboscq | C03C 1/002 65/29.17 |
| 2009/0320525 A1 * | 12/2009 | Johnson | C03B 5/193 65/346 |
| 2010/0137122 A1 * | 6/2010 | Nagai | C03C 3/087 65/90 |
| 2011/0054094 A1 * | 3/2011 | Nakahama | C09B 63/00 524/186 |
| 2011/0088432 A1 | 4/2011 | Purnode et al. | |
| 2011/0302962 A1 | 12/2011 | Gattermann et al. | |
| 2012/0017643 A1 * | 1/2012 | Lindig | C03B 5/23 65/135.1 |
| 2013/0239618 A1 * | 9/2013 | Ishikawa | C03B 5/173 65/347 |
| 2013/0283861 A1 | 10/2013 | Mobley et al. | |
| 2013/0327092 A1 | 12/2013 | Charbonneau | |
| 2013/0327096 A1 | 12/2013 | Huber et al. | |

| | | | |
|---|---|---|---|
| 2014/0007622 A1 | 1/2014 | Shock et al. | |
| 2014/0029088 A1 | 1/2014 | Goodwin et al. | |
| 2014/0090419 A1 * | 4/2014 | Charbonneau | C03B 5/193 65/135.1 |
| 2014/0090421 A1 | 4/2014 | Shock et al. | |
| 2014/0090423 A1 * | 4/2014 | Charbonneau | C03B 5/20 65/135.1 |
| 2014/0102147 A1 * | 4/2014 | Swiler | C03B 5/173 65/135.2 |
| 2014/0144185 A1 * | 5/2014 | Shock | C03B 5/225 65/346 |
| 2014/0245793 A1 * | 9/2014 | Howse | C03B 5/2257 65/346 |
| 2014/0356608 A1 | 12/2014 | Lentes et al. | |
| 2014/0376868 A1 * | 12/2014 | Ritter | C03C 3/066 423/618 |
| 2015/0050461 A1 * | 2/2015 | Yang | C03C 3/112 428/156 |
| 2015/0197440 A1 | 7/2015 | Shock et al. | |
| 2015/0251941 A1 * | 9/2015 | Clark | C03B 5/207 65/374.13 |
| 2015/0274566 A1 * | 10/2015 | Boughton | H01J 37/32825 65/133 |
| 2016/0122221 A1 * | 5/2016 | Huber | C03B 5/44 65/346 |
| 2016/0168001 A1 * | 6/2016 | Demott | C03B 5/2356 432/13 |
| 2017/0015579 A1 * | 1/2017 | Charbonneau | F23D 14/22 |
| 2017/0050874 A1 * | 2/2017 | Mario | C03B 5/04 |
| 2017/0057855 A1 * | 3/2017 | Swiler | C03B 5/435 |
| 2017/0073262 A1 | 3/2017 | Charbonneau et al. | |
| 2017/0081232 A1 * | 3/2017 | Urata | C03B 5/193 |
| 2017/0113958 A1 | 4/2017 | Charbonneau et al. | |
| 2017/0158544 A1 | 6/2017 | Shock et al. | |
| 2017/0341965 A1 * | 11/2017 | Claussen | C03B 5/16 |
| 2018/0105446 A1 | 4/2018 | Faulkinbury et al. | |
| 2018/0141857 A1 * | 5/2018 | Sakurabayashi | C03B 17/064 |
| 2018/0251394 A1 * | 9/2018 | Frink | C04B 35/6264 |
| 2019/0284076 A1 * | 9/2019 | Wang | C03B 5/225 |
| 2019/0284079 A1 | 9/2019 | Wang et al. | |
| 2019/0362754 A1 * | 11/2019 | Sato | C03C 3/091 |
| 2020/0102240 A1 * | 4/2020 | Sorg | C03B 5/04 |
| 2021/0087102 A1 * | 3/2021 | Simard | C03C 14/002 |
| 2021/0094856 A1 | 4/2021 | Weil et al. | |
| 2021/0094858 A1 | 4/2021 | Wang et al. | |
| 2021/0094859 A1 * | 4/2021 | Wang | C03B 5/2356 |
| 2021/0094860 A1 | 4/2021 | Pinc et al. | |
| 2021/0094861 A1 * | 4/2021 | Wang | C03B 5/1672 |
| 2021/0246060 A1 | 8/2021 | Vempati et al. | |
| 2021/0246061 A1 | 8/2021 | Vempati et al. | |
| 2021/0246062 A1 | 8/2021 | Vempati et al. | |
| 2021/0347679 A1 | 11/2021 | Ellison et al. | |
| 2023/0021281 A1 * | 1/2023 | Römer | C03B 5/031 |

FOREIGN PATENT DOCUMENTS

| | | |
|---|---|---|
| DE | 102009013714 A1 | 9/2010 |
| DE | 102009002336 A1 | 10/2010 |
| EP | 1473284 A1 | 11/2004 |
| EP | 3162771 A1 | 5/2017 |
| EP | 3214050 A1 | 9/2017 |
| FR | 2456713 | 12/1980 |
| WO | WO2015134315 A1 | 9/2015 |

OTHER PUBLICATIONS

Hujova, et al., Ceramics-Silikaty, "Influence of fining agents on glass melting: A review, Part I", vol. 61, No. 2, pp. 119-126, 2017.
Hujova, et al., Ceramics-Silikaty, "Influence of fining agents on glass melting: A review, Part 2", vol. 61, No. 3, pp. 202-208, 2017.
Hubert, CelSian, "IMI-NFG Course on Processing of Glass—Lecture 2: industrial glass melting and fining processes", 2015.
Chile Informe de Busqueda (Search Report), Serial No. 202103110, Applicant: Owens-Brockway Glass Container Inc., Date: Jan. 31, 2023.

(56) References Cited

OTHER PUBLICATIONS

Chile Informe Pericial (Expert Report), Serial No. 202103110, Applicant: Owens-Brockway Glass Container Inc., Date: Jan. 31, 2023.

Colombian Office Action, Application No. NC20220003295, Applicant: Owens-Brockway Glass Container Inc., Dated: Jan. 9, 2025.

* cited by examiner

SELECTIVE CHEMICAL FINING OF SMALL BUBBLES IN GLASS

The present disclosure is directed to glass fining and, more specifically, to techniques for targeting and selectively exposing small bubbles, which might otherwise be too small to quickly ascend to the glass surface, to a fining agent.

BACKGROUND

Glass is a rigid amorphous solid that has numerous applications. Soda-lime-silica glass, for example, is used extensively to manufacture flat glass articles including windows, hollow glass articles including containers such as bottles and jars, and also tableware and other specialty articles. Soda-lime-silica glass comprises a disordered and spatially crosslinked ternary oxide network of $SiO_2$—$Na_2O$—$CaO$. The silica component ($SiO_2$) is the largest oxide by weight and constitutes the primary network forming material of soda-lime-silica glass. The $Na_2O$ component functions as a fluxing agent that reduces the melting, softening, and glass transition temperatures of the glass, as compared to pure silica glass, and the $CaO$ component functions as a stabilizer that improves certain physical and chemical properties of the glass including its hardness and chemical resistance. The inclusion of $Na_2O$ and $CaO$ in the chemistry of soda-lime-silica glass renders the commercial manufacture of glass articles more practical and less energy intensive than pure silica glass while still yielding acceptable glass properties. Soda-lime-silica glass, in general and based on the total weight of the glass, has a glass chemical composition that includes 60 wt % to 80 wt % $SiO_2$, 8 wt % to 18 wt % $Na_2O$, and 5 wt % to 15 wt % $CaO$.

In addition to $SiO_2$, $Na_2O$, and $CaO$, the glass chemical composition of soda-lime-silica glass may include other oxide and non-oxide materials that act as network formers, network modifiers, colorants, decolorants, redox agents, or other agents that affect the properties of the final glass. Some examples of these additional materials include aluminum oxide ($Al_2O_3$), magnesium oxide (MgO), potassium oxide ($K_2O$), carbon, sulfates, nitrates, fluorines, chlorines, and/or elemental or oxide forms of one or more of iron, arsenic, antimony, selenium, chromium, barium, manganese, cobalt, nickel, sulfur, vanadium, titanium, lead, copper, niobium, molybdenum, lithium, silver, strontium, cadmium, indium, tin, gold, cerium, praseodymium, neodymium, europium, gadolinium, erbium, and uranium. Aluminum oxide is one of the more commonly included materials—typically present in an amount up to 2 wt % based on the total weight of the glass—because of its ability to improve the chemical durability of the glass and to reduce the likelihood of devitrification. Regardless of what other oxide and/or non-oxide materials are present in the soda-lime-glass besides $SiO_2$, $Na_2O$, and $CaO$, the sum total of those additional materials is preferably 10 wt % or less, or more narrowly 5 wt % or less, based on the total weight of the soda-lime-silica glass.

The manufacture of glass involves melting a vitrifiable feed material (sometimes referred to as a glass batch) in a furnace or melter within a larger volume of molten glass. The vitrifiable feed material may include virgin raw materials, recycled glass (i.e., cullet), glass precursor oxides, etc., in proportions that result in glass having a certain glass composition upon melting and reacting of the feed material. When the vitrifiable feed material is melted into glass, gas bubbles of various sizes are typically produced and become entrained within the glass. The production of gas bubbles is especially pronounced if the vitrifiable feed material is melted in a submerged combustion melter that includes submerged burners positioned to fire their combustion products directly into the glass melt. The quantity of gas bubbles entrained within the glass may need to be reduced to satisfy commercial specifications for "bubble free" glass. The removal of gas bubbles—a process known as "fining"—may be warranted for various reasons including the visual appearance of the glass when cooled and formed into a finished commercial article such as a glass container, flat glass product, or tableware. Glass fining has traditionally been accomplished by heating the glass to achieve a glass viscosity more conducive to bubble ascension and/or by adding a fining agent into the glass.

A fining agent is chemical compound that reacts within the glass at elevated temperatures to release fining gases such as $O_2$, $SO_2$, and/or possibly others into the glass. The fining gases help eradicate smaller gas bubbles that result from melting of the vitrifiable feed material other than those attributed to the fining agent ("native bubbles"). The fining gases, more specifically, form new gas bubbles ("fining bubbles") and/or dissolve into the glass melt. The fining bubbles rapidly ascend to the surface of the glass—where they ultimately exit the glass melt and burst—and during their ascension may sweep up or absorb the smaller native gas bubbles along the way. The fining gases that dissolve into the glass melt may diffuse into the smaller native bubbles to increase the size and the buoyancy rise rate of those bubbles. The fining gases may also change the redox state [$Fe^{2+}/(Fe^{2+}+Fe^{3+})$ in which $Fe^+$ is expressed as FeO and $Fe^{3+}$ is expressed as $Fe_2O_3$] of the glass and cause some of the smaller native bubbles to disappear as the gas(es) in those bubbles dissolves into the glass melt. Any one or a combination of these mechanisms may be attributed to the fining agent.

A fining agent has traditionally been added to the vitrifiable feed material or metered separately into the glass. Whether the fining agent is included in the vitrifiable feed material or added separately, the resultant fining gases interact indiscriminately with gas bubbles of all sizes within the glass. Such broad exposure of the fining gases to all gas bubbles is somewhat inefficient since the larger native bubbles will quickly ascend through the glass and burst on their own regardless of whether a fining agent is added to the glass. Additionally, if the fining agent is introduced separately from the vitrifiable feed material, mechanical stirring may be used to uniformly mix the fining agent throughout the glass. But stirring the glass breaks larger native bubbles into smaller gas bubbles and counteracts the fining process by drawing bubbles (both large and small) back down into the glass away from the surface of the glass. As such, to clear the glass of bubbles, the amount of the fining agent added to the glass is usually based on the total amount of native gas bubbles that may be contained in the glass even though the smaller native bubbles dictate how much time is required to fine the glass since those bubbles ascend through the glass at the slowest pace or do not ascend at all.

The current practices of unselectively introducing a fining agent into the glass requires the consumption of an excess amount of the fining agent. This can increase the cost of materials as well as the operating costs associated with the fining process. Moreover, the fining process is not as optimized as it could be due to the oversupply of the fining agent and the corresponding fining activity that must be supported, which results in additional fining time beyond what is theoretically required to remove only the smaller native bubbles. The present disclosure addresses these shortcomings of current fining procedures by selectively exposing the smaller native bubbles in the glass to one or more fining agents. The targeted exposure of smaller native bubbles to the fining agent(s) may reduce the need to add excessive amounts of the fining agent to the glass, thus saving material and energy costs, and may also speed the overall fining process since the fining gases introduced into the glass can be minimized while still targeting and removing the smaller native bubbles. The fining agent(s) do not necessarily have to be exposed to the larger native bubbles since doing so is unlikely to have a noticeable impact on the amount of time it takes to fine the glass.

SUMMARY OF THE DISCLOSURE

The present disclosure is directed to an apparatus and method for fining glass. The apparatus is a fining vessel that receives an input molten glass. The input molten glass has a first density and a first concentration of entrained gas bubbles. The fining vessel may be a stand-alone tank that receives the input molten glass from a separate melter, such as a submerged combustion melter, or it may be part of a larger Siemens-style furnace that receives the input molten glass from an upstream melting chamber. The input molten glass is combined with and subsumed by a molten glass bath contained within a fining chamber defined by a housing of the fining vessel. The molten glass bath flows through the fining chamber along a flow direction from an inlet to an outlet of the fining vessel. Output molten glass is discharged from the fining vessel after flowing through the fining chamber. The output molten glass has a second density that is greater than the first density and a second concentration of entrained gas bubbles that is less than the first concentration of entrained gas bubbles. To facilitate fining of the glass, a skimmer is partially submerged in the molten glass bath. The skimmer defines a submerged passageway together with corresponding portions of the housing of the fining vessel. An undercurrent of the molten glass bath flows through the submerged passageway and is exposed to one or more fining agents beneath the skimmer to better target smaller gas bubbles for removal.

The present disclosure embodies a number of aspects that can be implemented separately from or in combination with each other. According to one embodiment of the present disclosure, a method of fining glass includes several steps. One step involves supplying input molten glass into a fining chamber of a fining vessel. The input molten glass combines with a molten glass bath contained within the fining chamber and introduces entrained gas bubbles into the molten glass bath. The input molten glass has a density and a concentration of gas bubbles. Another step of the method involves flowing the molten glass bath through the fining chamber in a flow direction. The molten glass bath has an undercurrent that flows beneath a skimmer, which is partially submerged in the molten glass bath, and through a submerged passageway defined in part by the skimmer. Still another step of the method involves introducing a carrier gas into the undercurrent of the molten glass bath directly beneath the skimmer. The carrier gas comprises suspended particles of one or more fining agents.

According to another aspect of the present disclosure, a method of producing and fining glass includes several steps. One step involves discharging combustion products from one or more submerged burners directly into a glass melt contained within an interior reaction chamber of a submerged combustion melter. The combustion products discharged from the one or more submerged burners agitate the glass melt. Another step of the method involves discharging foamy molten glass obtained from the glass melt out of the submerged combustion melter. Still another step of the method involves supplying the foamy molten glass into a fining chamber of a fining vessel as input molten glass. The input molten glass combines with a molten glass bath contained within the fining chamber and introduces entrained gas bubbles into the molten glass bath. The input molten glass has a density and comprises up to 60 vol % bubbles. Another step of the method involves flowing the molten glass bath through the fining chamber in a flow direction. The molten glass bath has an undercurrent that flows beneath a skimmer, which is partially submerged in the molten glass bath, and through a submerged passageway defined in part by the skimmer. Yet another step of the method involves introducing a carrier gas into the undercurrent of the molten glass bath directly beneath the skimmer. The carrier gas comprises suspended particles of one or more fining agents. And still another step of the method involves discharging output molten glass from the fining vessel. The output molten glass has a density that is greater than the density of the input molten glass and further comprises less than 1 vol % bubbles.

According to yet another aspect of the present disclosure, a fining vessel for fining glass includes a housing that defines a fining chamber. The housing has a roof, a floor, and an upstanding wall that connects the roof and the floor. The housing further defines an inlet to the fining chamber and an outlet from the fining chamber. The fining vessel also includes a skimmer that extends downwards from the roof of the housing towards the floor of the housing and further extends across the fining chamber between opposed lateral sidewalls of the upstanding wall. The skimmer has a distal free end that together with corresponding portions of the floor and upstanding wall defines a submerged passageway. Moreover, a plurality of nozzles are supported in the floor of the housing directly beneath the skimmer. Each of the nozzles is configured to dispense a carrier gas into the fining chamber. The carrier gas includes a main gas that contains suspended particles of one or more fining agents.

BRIEF DESCRIPTION OF THE DRAWINGS

The disclosure, together with additional objects, features, advantages, and aspects thereof, will be best understood from the following description, the appended claims, and the accompanying drawings, in which:

DETAILED DESCRIPTION

Figure 1:
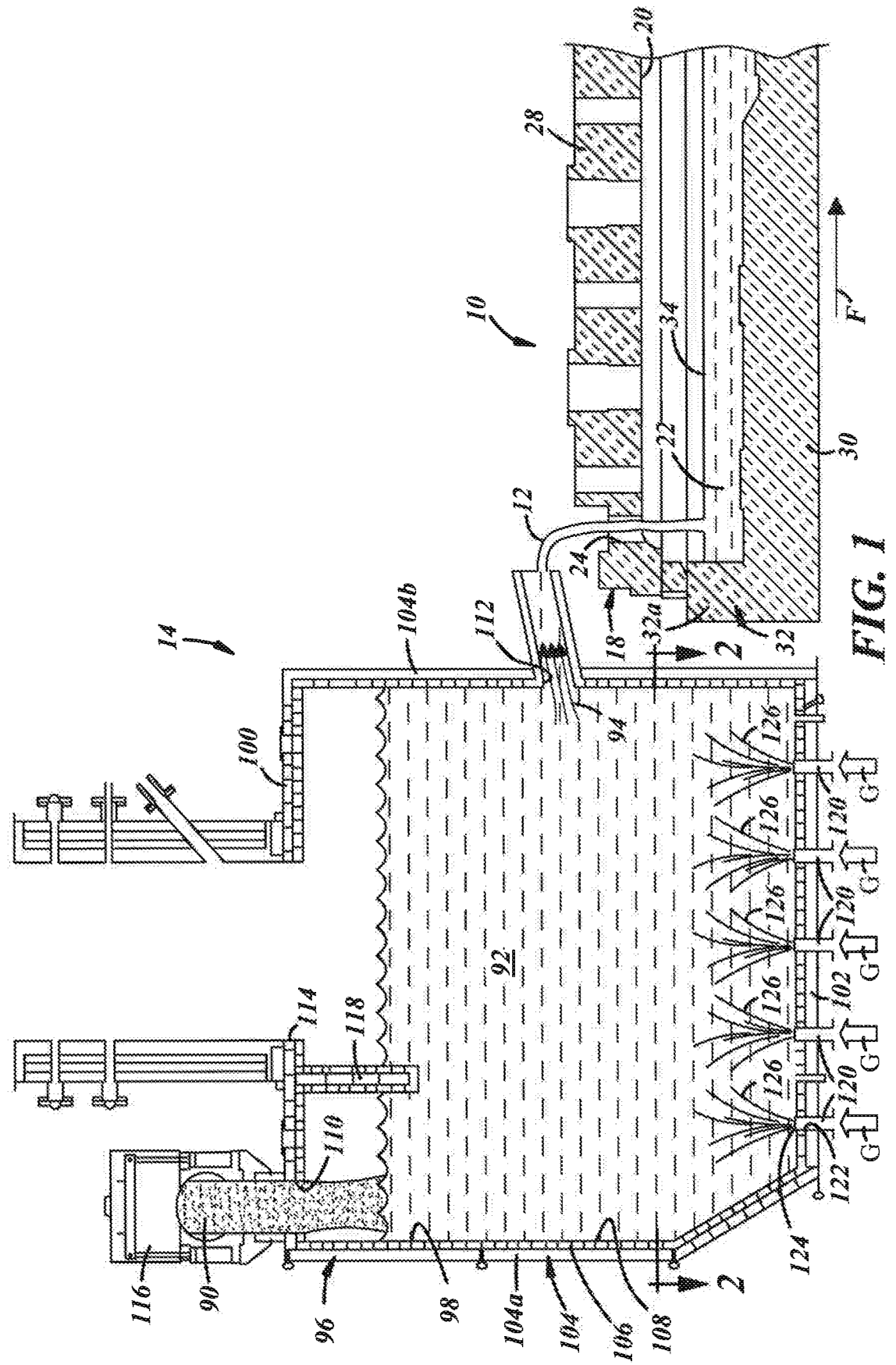
FIG. 1 is an elevated cross-sectional representation of a submerged combustion melter and a fining vessel that receives molten glass produced by the submerged combustion melter according to one embodiment of the present disclosure.

The disclosed apparatus and fining method are preferably used to fine molten glass produced by melting a vitrifiable feed material via submerged combustion melting. As will be described in further detail below, submerged combustion melting involves injecting a combustible gas mixture that comprises fuel and an oxidant directly into a glass melt contained in a submerged combustion melter though submerged burners. The combustible gas mixture autoignites and the resultant combustion products cause vigorous stirring and turbulence as they are discharged through the glass melt. The intense shearing forces experienced between the combustion products and the glass melt cause rapid heat transfer and particle dissolution throughout the glass melt. While submerged combustion technology can melt and integrate a vitrifiable feed material into the glass melt relatively quickly, thus resulting in relatively low glass residence times, the glass melt tends to be foamy and have a relatively low density despite being chemically homogenized when discharged from the melter. Fining foamy molten glass discharged from the glass melt in accordance with the present disclosure can render the fining process more efficient. Of course, molten glass produced in other types of melting apparatuses, including a melting chamber of a conventional Siemens-style furnace, may also be fined in the same way.

Referring now to FIGS. 1-7, a glass fining vessel 10 is depicted according to one embodiment of the present disclosure. The glass fining vessel 10 receives an input molten glass 12 that originates from within a submerged combustion melter 14 and discharges output molten glass 16 for additional processing into a finished article. The glass fining vessel 10 has a housing 18 that defines a fining chamber 20 in which a molten glass bath 22 is contained. The housing 18 further defines an inlet 24 through which the input molten glass 12 is received and an outlet 26 through which the output molten glass 16 is discharged. The input molten glass 12 combines with and is subsumed by the molten glass bath 22, and the output molten glass 16 is drawn from the molten glass bath 22 at a location downstream from the inlet 24. As such, the molten glass bath 22 flows through the fining chamber 20 in a flow direction F from the inlet 24 to the outlet 26 of the glass fining vessel 10 while being fined along the way as described in more detail below.

The housing 18 of the glass fining vessel 10 includes a roof 28, a floor 30, and an upstanding wall 32 that connects the roof 28 and the floor 30. The upstanding wall 32 typically includes an inlet or front end wall 32a, an outlet or back end wall 32b, and two opposed lateral sidewalls 32c, 32d that join the inlet end and outlet end walls 32a, 32b. The housing 18 of the fining vessel 10 is constructed from a one or more refractory materials. Refractory materials are a class of inorganic, non-metallic materials that can withstand high-temperatures while remaining generally resistant to thermal stress and corrosion. In one particular embodiment, the floor 30 and the glass-contacting portions of the upstanding wall 32 may be formed from fused cast AZS (alumina-zirconia-silicate), bond AZS, castable AZS, high alumina, alumina-chrome, or alumina-silica type refractories. Insulating bricks and ceramic fire boards may be disposed behind these portions of the housing 18. As for the roof 28 and the superstructure (i.e., the non-glass contacting portion of the upstanding wall 32), those portions of the housing 18 may be formed from an alumina-silica refractory such as mullite.

The inlet 24 to the fining vessel 10 may be defined in the roof 28 of the housing 18 proximate the inlet end wall 32a, as shown, although it may also be defined in the inlet end wall 32a either above or below a surface 34 of the molten glass bath 22 or in one or both of the lateral sidewalls 32c, 32d either above or below the surface 34 of the molten glass bath 22. The inlet 24 provides an entrance to the fining chamber 20 for the introduction of the input molten glass 12 at a feed rate RF. The inlet 24 may be fluidly coupled to the submerged combustion melter 14 or an intermediate holding tank (not shown) located between the submerged combustion melter 14 and the fining vessel 10 by a contained conduit or, in another implementation, such as the one illustrated here, the inlet 24 may be positioned in flow communication with the input molten glass 12 so that the input molten glass 12 can be poured into the fining chamber 20 while being exposed to the ambient environment. An example of an intermediate holding tank that may be fluidly positioned between the submerged combustion melter 14 and the fining vessel 10 is the stilling vessel that is disclosed in U.S. Pub. No. 2021/0094857 (U.S. application Ser. No. 16/590,068), which is assigned to the assignee of the present invention and is incorporated herein by refererence in its entirety.

The outlet 26 of the fining vessel 10 may be defined in the outlet end wall 32b either adjacent to the floor 30 (as shown) or above the floor 30 yet beneath the surface 34 of the molten glass bath 22. The outlet 26 may also be defined in the floor 30 or in one or both of the lateral sidewalls 32c, 32d beneath the surface 34 of the molten glass bath 22 and proximate the outlet end wall 32b. The outlet 26 provides an exit from the fining chamber 20 for the discharge of the output molten glass 16 at a discharge or pull rate RD. In the context of commercial glass container manufacturing, the outlet 26 of the fining vessel 10 may fluidly communicate with a spout chamber 36 of a spout 38 appended to the outlet end wall 32b. The spout 38 includes a spout bowl 40, which defines the spout chamber 36 along with an orifice plate 42, and further includes at least one reciprocal plunger 44 that reciprocates to control the flow of accumulated output molten glass 46 held within the spout chamber 36 through an aligned orifice 48 in the orifice plate 42 to fashion streams or runners of glass. These streams or runners of glass may be sheared into glass gobs of a predetermined weight that can be individually formed into glass containers upon delivery to glass container forming machine.

The fining vessel 10 includes a skimmer 50 positioned between the inlet 24 and the outlet 26. The skimmer 50 is formed of a refractory material such as the refractories disclosed above for the glass-contacting portions of the upstanding wall 32. As shown best in FIGS. 5 and 7, the skimmer 50 extends downwardly from the roof 28 of the housing 18 and is partially submerged in the molten glass bath 22. At least a submerged portion 52 of the skimmer 50 extends across the fining chamber 20 between the lateral sidewalls 32c, 32d of the housing 18 and has an upstream face 54, an opposite downstream face 56, and a distal free end 58 connecting the upstream and downstream faces 54, 56. The distal free end 58 of the skimmer 50 is separated from the floor 30 of the housing 18 by a distance TD and, consequently, defines a submerged passageway 60 along with corresponding portions of the floor 30 and the sidewalls 32c, 32d. The establishment of the submerged passageway 60 causes an undercurrent 62 of the molten glass bath 22 to flow beneath the skimmer 50 and through the submerged passageway 60 as the glass bath 22 as a whole flows along the flow direction F towards the outlet 26 of the fining vessel 10. The skimmer 50 has a centerplane 64 that is parallel to a vertical reference plane 66, which is perpendicular to the horizontal or gravity level, or angled at no more than 5° from the vertical reference plane 66 in either direction.

At least one fining agent is introduced into the molten glass bath 22 directly beneath the skimmer 50 in direct exposure to the undercurrent 62 of the molten glass bath 22. The fining agent(s) are delivered by a carrier gas 68 in which one or more fining agents are suspended as a particulate. The term "directly beneath the skimmer" as used herein refers to a zone 70 (FIG. 7) of the fining chamber 20 defined by sectioning the skimmer 50 where its thickness ST as measured between the upstream face 54 and the downstream face 56 is greatest, and then extending first and second planes 70a, 70b from the upstream and downstream faces 54, 56 of the skimmer 50 where sectioned, respectively, parallel with the centerplane 64 of the skimmer 50 such that the planes 70a, 70b intersect the floor 30 and the upstanding wall 32 of the housing 18. The volume between the skimmer 50, the floor 30, the sidewalls 32c, 32d, and the extended planes 70a, 70b is the zone 70 that is considered to be directly beneath the skimmer 50. By introducing at least one fining agent into this zone 70, smaller gas bubbles can more easily be targeted for removal.

Figures 6, 7, 8:
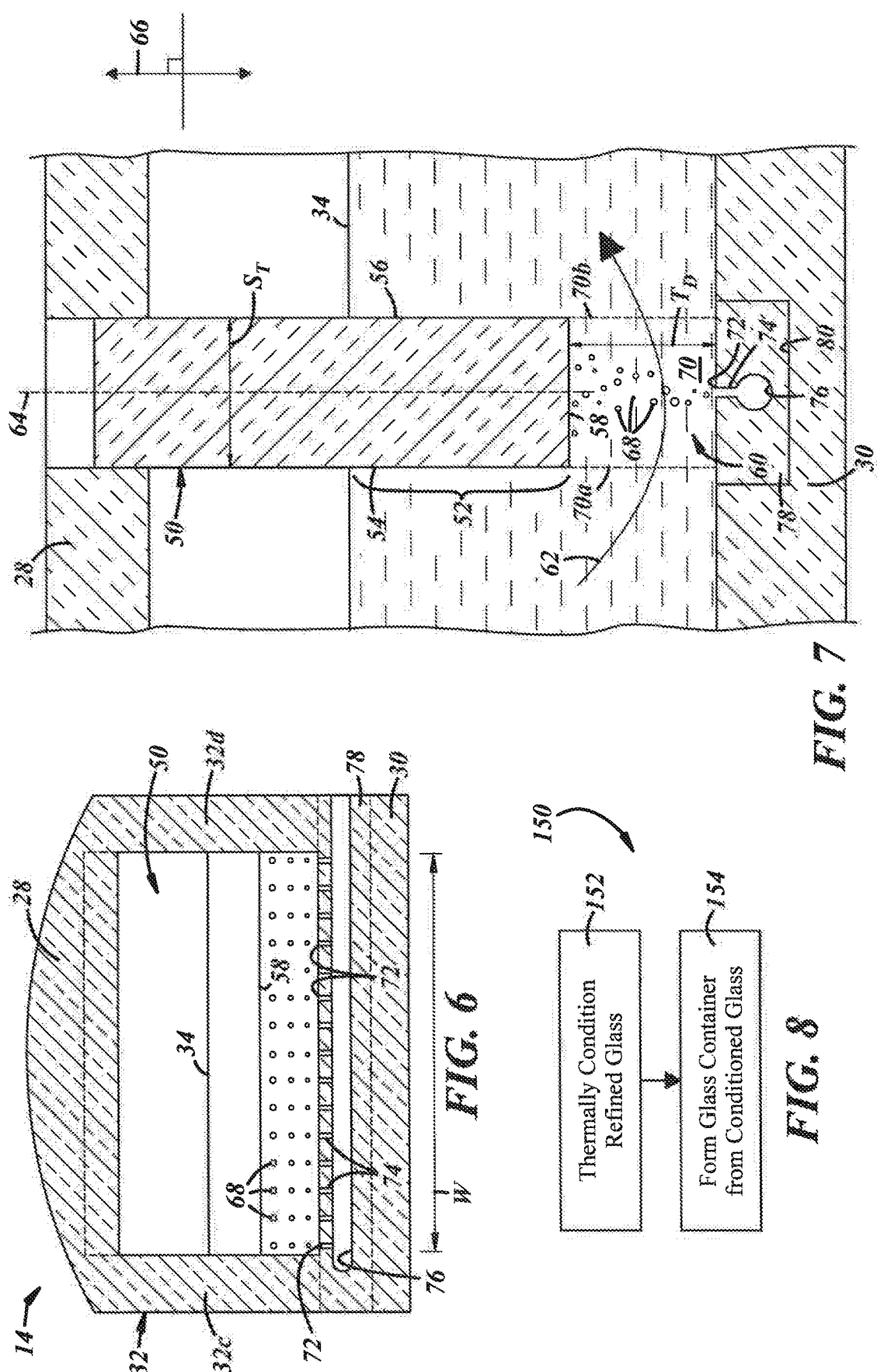
FIG. 6 is cross-sectional view of the fining vessel taken along section lines 6-6 in FIG. 5.
FIG. 7 is a magnified view of the skimmer illustrated in FIG. 5.
FIG. 8 is a flow diagram of a process for forming glass containers from the output molten glass discharged from the fining vessel according to one embodiment of the present disclosure.

The carrier gas 68 may be introduced into the glass melt 22 directly beneath the skimmer 50 through a plurality of nozzles 72 supported in corresponding openings defined in the floor 30 of the housing 18. Each of the nozzles 72 has a feeder line 74 that fluidly communicates with a carrier gas supply conduit 76. The carrier gas supply conduit 76 supplies the carrier gas 68 from a source (not shown) of the gas 68 external to the fining vessel 10 at an appropriate pressure to ensure that the carrier gas 68 can be dispensed through the glass melt 22. Preferably, to help ensure good exposure of the undercurrent 62 to the carrier gas 68, the gas supply conduit 76 runs along a width W of the fining chamber 20 (FIG. 4) between the lateral sidewalls 32c, 32d and beneath the distal free end 58 of the skimmer 50 within the zone 70 under the skimmer 50, and the nozzles 72 are spaced apart across the width W of the fining chamber 20 to provide a row of carrier gas effervescence that extends transverse to the flow direction F of the molten glass bath 22 and rises upwards from the floor 30 of the housing 18, as depicted in FIG. 6. To help position the carrier gas supply conduit 76 and the nozzles 72 directly beneath the skimmer 50, the carrier gas supply conduit 76, the feeder lines 74, and the nozzles 72 may be contained within a refractory support block 78 that is received in a channel 80 defined in the floor 30 of the housing 18. The channel 80, as shown, may extend across the width W of the fining chamber 20, and the support block 78 may be slidable from one sidewall 32c, 32d to the other sidewall 32c, 32d for easy insertion and removal.

The carrier gas 68 includes a main gas that supports the particles of the one or more fining agents. The main gas may be air or another non-dissolvable gas including, for example, nitrogen. The one or more fining agents suspended in the main gas may be any compound or a combination of compounds that release fining gases into the molten glass bath 22 when exposed to the thermal environment of the molten gas bath 22. In particular, the fining agent(s) may include a sulfate such as sodium sulfate (salt cake), which decomposes to release $O_2$ and $SO_2$ as the fining gases. Other fining agents that may be carried in the carrier gas 68 include $Cr_2O_3$, $WO_3$, or reactive carbon, aluminum, a carbonate, silicon carbide (SiC), oxidized metal powder, and combinations thereof. The particles of the fining agent(s) may be sized to ensure that they are suspendable within and transportable by the main gas of the carrier gas 68. For instance, the particles of the fining agent(s) may have particle sizes in which a largest particle dimension ranges from 0.05 mm to 5 mm or, more narrowly, from 0.1 mm to 1 mm. The particles of the fining agent(s) may also constitute anywhere from 1 vol % to 30 vol % of the carrier gas 68. The particles of the fining agents(s) are preferably the only particulate matter included within the carrier gas 68 to avoid upsetting the local chemistry of the molten glass bath 22.

The skimmer 50 may separate gas bubbles 82 introduced into the molten glass bath 22 by the input molten glass 12 according to the size of the gas bubbles 82. As discussed above, the input molten glass 12 contains bubbles of various sizes as a result of melting the vitrifiable feed material in the submerged combustion melter 14. The input molten glass 12 has a first density and first concentration of entrained gas bubbles. Here, as a result of submerged combustion melting, the input molten glass 12 typically has a density between 0.75 $gm/cm^3$ and 1.5 $gm/cm^3$, or more narrowly between 0.99 $gm/cm^3$ and 1.3 $gm/cm^3$, and a concentration of entrained gas bubbles ranging from 30 vol % to 60 vol % for soda-lime-silica glass. The gas bubbles carried within the input molten glass 12 and added to the molten glass bath 22 have a diameter that typically ranges from 0.10 mm to 0.9 mm and, more narrowly, from 0.25 mm to 0.8 mm. Compared to gas bubbles having a diameter of greater than 0.7 mm, gas bubbles having a diameter of 0.7 mm or less are more likely to remain suspended in the deeper regions of the molten glass bath 22 as the molten glass bath 22 flows along the flow direction F. The density and bubble concentration values stated above may be different. For example, if the input molten glass 12 is obtained from a Siemens-style melting furnace, the density and bubble concentration values would likely be greater than, and less than, the above-stated ranges, respectively, for soda-lime-silica glass.

The skimmer 50 can be sized and positioned to achieve the desired separation of the gas bubbles 82. Each of the following three design characteristics of the skimmer 50 effects the size of the bubbles that pass beneath the skimmer 50 and through the submerged passageway 60: (1) a distance SD between the centerplane 64 of the skimmer 50 at the axial free end 58 and the inlet end wall 32a along the flow direction F; (2) the distance TD between the free end 58 of the skimmer 50 and the floor 30 of the housing 18; and (3) the discharge rate RD of the output molten glass 16 through the outlet 26 of the fining vessel 10. By increasing the distance SD between the skimmer 50 and the inlet end wall 32a (characteristic 1 above), the bubbles 82 have more time to ascend to the surface 34 of the molten glass batch 22 and burst before reaching the upstream face 54 of the skimmer 50. Likewise, decreasing the distance SD between the skimmer 50 and the inlet end wall 32a provides the bubbles 82 with less time to ascend to the surface 34 of the molten glass bath 22 and burst. Accordingly, the size of the gas bubbles 82 that are drawn under the skimmer 50 within the undercurrent 62 tends to decrease as the distance SD between the skimmer 50 and the inlet end wall 32a increases.

Additionally, the size of the gas bubbles 82 that are drawn under the skimmer 50 within the undercurrent 62 tends to decrease as the distance TD between the free end 58 of the skimmer 50 and the floor 30 of the housing 18 (characteristic 2 above) decreases, and vice versa. Indeed, as the distance TD between the free end 58 of the skimmer 50 and the floor 30 decreases, the skimmer 50 is submerged deeper into the molten glass bath 22 and the size of the gas bubbles 82 that are drawn under the skimmer 50 within the undercurrent 62 also decreases. Conversely, as the distance TD between the free end 58 of the skimmer 50 and the floor 30 increases, the skimmer 50 is submerged shallower into the molten glass bath 22, and the size of the gas bubbles 82 being drawn under the skimmer 50 within the undercurrent 62 increases since molten glass closer to the surface 34 of the molten glass bath 22 can now flow beneath the skimmer 50. Lastly, a higher discharge rate RD of the output molten glass 16 (characteristic 3 above) reduces the residence time of the molten glass bath 22 and tends to increase the size of the gas bubbles 82 that are drawn under the skimmer 50 within the undercurrent 62, while a lower discharge rate RD of the output molten glass 16 has the opposite effect.

By balancing the three design characteristics set forth above, the skimmer 50 may be sized and positioned so that the gas bubbles 82 that pass beneath the skimmer 50 within the undercurrent contain at least 95% of smaller gas bubbles that have diameters of less than 0.7 mm or, more preferably, less than 0.5 mm. The larger gas bubbles having diameters of 0.7 mm or greater ascend too quickly and eventually rise to the surface 34 of the molten glass bath 22 upstream of the skimmer 50 and burst. In one implementation of the skimmer 50, in which the glass discharge rate (characteristic 3) is 100 tons per day, the first and second design characteristics set forth above may lie within the ranges detailed below in Table 1 to achieve at least 95% of smaller gas bubbles within the undercurrent 62, although other combinations of characteristics 1-3 are certainly possible.

TABLE 1

| Skimmer Parameters (100 tpd glass discharge rate) | |
| --- | --- |
| Parameter | Range |
| $S_D$ | 180 Feet to 250 Feet |
| $T_D$ | 3 Inches to 10 Inches |

Using the skimmer 50 to separate the gas bubbles 82 so that a contingent of smaller gas bubbles primarily passes beneath the skimmer 50 is advantageous in one respect; that is, the separation ensures that the smaller gas bubbles carried by the undercurrent 62 through the submerged passageway 60 are selectively exposed to the carrier gas 68 and the fining gases produced from the fining agent(s) delivered by the carrier gas 68 into the molten glass bath 22.

Figures 4, 5:
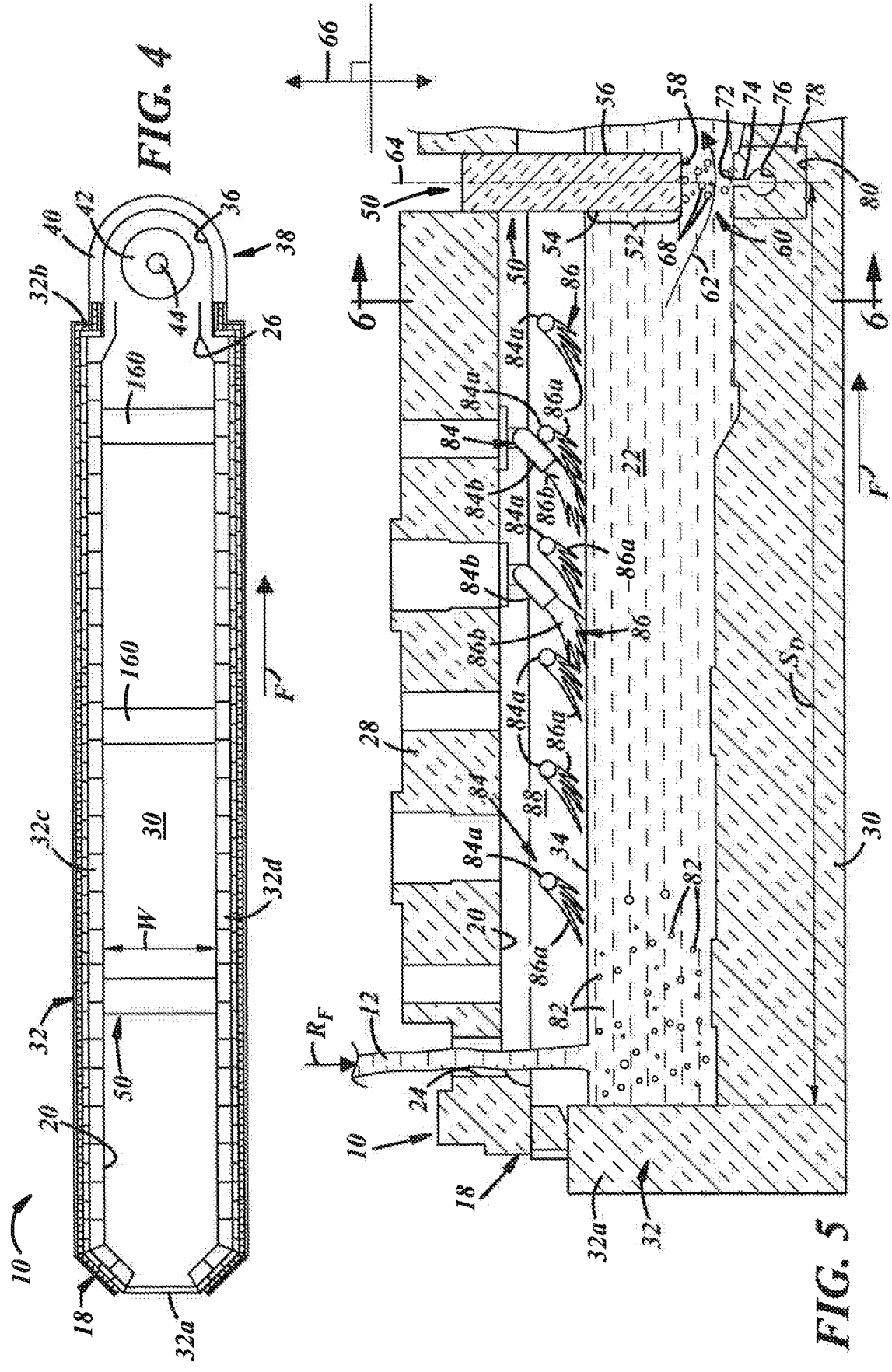
FIG. 4 is a cross-sectional plan view of the fining vessel depicted in FIG. 3 and taken along section line 4-4.
FIG. 5 is a magnified elevated cross-sectional view of a portion of the fining vessel shown in FIG. 3 including a skimmer positioned within the fining vessel.

The housing 18 of the fining vessel 10 may also support one or more non-submerged burners 84 to heat the molten glass bath 22 and curtail an undesired increase in viscosity. Each of the non-submerged burners 84 combusts a mixture of a fuel and an oxidant. The non-submerged burners 84 may include one or more sidewall burners 84a mounted in one or both of the lateral sidewalls 32c, 32d of the housing 18, one or more roof burners 84b mounted in the roof 28 of the housing 18, or both types of burners 84a, 84b. For example, as shown in FIG. 5, a plurality of sidewall burners 84a may be mounted in one or both of the sidewalls 32c, 32d in spaced relation along the flow direction F between the inlet 24 and the outlet 26 of the fining vessel 10. Each of the plurality of sidewall burners 84a may be fixedly or pivotably mounted within a burner block.

The combustion products 86a emitted from the burners 84a may be aimed into an open atmosphere 88 above the surface 34 of the molten glass bath 22 or, alternatively, may be aimed toward the molten glass bath 22 so that the combustion products 86a directly impinge the surface 34 of the molten glass bath 22. The sidewall burners 84a may be pencil burners or some other suitable burner construction.

In addition to or in lieu of the sidewall burner(s) 84a, a plurality of roof burners 84b may be mounted in the roof 28 in spaced relation along the flow direction between the inlet 24 and the outlet 26 of the housing 18. In some instances, and depending on the burner design, multiple rows of roof burners 84b may be spaced along the flow direction F of the molten glass bath 22, with each row of burners 84b including two or more burners 84b aligned perpendicular to the flow direction F. Each of the roof burners 84b may be a flat flame burner that supplies low-profile combustion products 86b and heat into the open atmosphere 88 above the surface 34 of the molten glass, or, in an alternate implementation, and as shown here, each burner 84b may be a burner that is fixedly or pivotably mounted within a burner block and aimed to direct its combustion products 86b into direct impingement with the top surface 34 of the molten glass bath 22. If a roof burner 86b of the latter impingement variety is employed, the burner is preferably mounted in the roof 28 of the housing 18 upstream of the skimmer 50 to suppress foam build-up.

The non-submerged burner(s) 84 may be configured so that their combustion products 86 impact the surface 34 of the molten glass bath 22 to aid in the fining of particularly foamy molten glass such as, for example, the glass produced in a submerged combustion melter. Foamy glass with a relatively high amount of bubbles can develop a layer of foam that accumulates on top of the molten glass bath 22. A layer of foam of this nature can block radiant heat flow and, as a result, insulate the underlying glass from any heat added to the open atmosphere 88 by non-submerged burners 84 that emit non-impinging combustion products. One way to overcome the challenges posed by foam is to break up or destroy the foam. Direct impingement between the combustion products 86 and the top surface 34 of the molten glass bath 22 can destroy and reduce the volume of any foam layer that may develop on top of the molten glass bath 22, which, in turn, can help improve heat transfer efficiency into the molten glass bath 22.

The operation of the fining vessel 10 will now be described in the context of fining glass produced in the upstream submerged combustion melter 14. In general, and referring now to FIG. 1, the submerged combustion melter (SC melter) 14 is fed with a vitrifiable feed material 90 that exhibits a glass-forming formulation. The vitrifiable feed material 90 is melt-reacted inside the SC melter 14 within an agitated glass melt 92 to produce molten glass. Foamy molten glass 94 is discharged from the SC melter 14 out of the glass melt 92. The foamy molten glass 94 is supplied to the fining vessel 10 as the input molten glass 12. The input molten glass 12 combines with and is subsumed by the molten glass bath 22 contained in the fining chamber 20 of the fining vessel 10. The molten glass bath 22 flows along the flow direction F from the inlet 24 of the fining vessel 10 to the outlet 26. As a result of this flow, the undercurrent 62 of the molten glass bath 22 that flows beneath the skimmer 50 is directly exposed to the carrier gas 68 that is introduced through the nozzles 72 and which carries the fining agent(s). The introduction of fining agents into the molten glass bath 22 directly beneath the skimmer 50 can selectively target smaller, more-difficult-to-remove gas bubbles, especially if the skimmer 50 is used to separate the gas bubbles 82 introduced into the molten glass bath 22 from the input molten glass 12 based on bubble size.

The SC melter 14 includes a housing 96 that defines an interior reaction chamber 98. The housing has a roof 100, a floor 102, and a surrounding upstanding wall 104 that connects the roof 100 and the floor 102. The surrounding upstanding wall 104 further includes a front end wall 104*a*, a back end wall 104*b* that opposes and is spaced apart from the front end wall 104*a*, and two opposed lateral sidewalls 104*c*, 104*d* that connect the front end wall 104*a* and the back end wall 104*b*. The interior reaction chamber 98 of the SC melter 14 holds the glass melt 92 when the melter 14 is operational. At least the floor 102 and the surrounding upstanding wall 104 of the housing 96, as well as the roof 100 if desired, may be constructed from one or more fluid-cooled panels through which a coolant, such as water, may be circulated. The fluid-cooled panels include a glass-side refractory material layer 106 that may be covered by a layer of frozen glass 108 that forms in-situ between an outer skin of the glass melt 92 and the refractory material layer 106. The glass-side refractory material layer 106 may be constructed from any of the refractories disclosed above for the glass-contacting portions of the upstanding wall 32 of the housing 18 of the fining vessel 10.

The housing 96 of the SC melter 14 defines a feed material inlet 110, a molten glass outlet 112, and an exhaust vent 114. As shown in FIG. 1, the feed material inlet 110 may be defined in the roof 100 of the housing 96 adjacent to or a distance from the front end wall 104*a*, and the molten glass outlet 112 may be defined in the back end wall 104*b* of the housing 96 adjacent to or a distance above the floor 102, although other locations for the feed material inlet 110 and the molten glass outlet 112 are certainly possible. The feed material inlet 110 provides an entrance to the interior reaction chamber 98 for the delivery of the vitrifiable feed material 90 by way of a batch feeder 116. The batch feeder 116 is configured to introduce a metered amount of the vitrifiable feed material 90 into the interior reaction chamber 98 and may be coupled to the housing 96. The molten glass outlet 112 outlet provides an exit from the interior reaction chamber 98 for the discharge of the foamy molten glass 94 out of the SC melter 14. The exhaust vent 114 is preferably defined in the roof 100 of the housing 96 between the front end wall 104*a* and the back end wall 104*b* and is configured to remove gaseous compounds from the interior reaction chamber 98. And, to help prevent the potential loss of some of the vitrifiable feed material 90 through the exhaust vent 114, a partition wall 118 that depends from the roof 100 of the housing 96 and is partially submerged into the glass melt 92 may be positioned between the feed material inlet 110 and the exhaust vent 114.

The SC melter 14 includes one or more submerged burners 120. Each of the one or more submerged burners 120 is mounted in a port 122 defined in the floor 102 (as shown) and/or the surrounding upstanding wall 104 at a portion of the wall 104 that is immersed by the glass melt 92. Each of the submerged burner(s) 120 forcibly injects a combustible gas mixture G into the glass melt 92 through an output nozzle 124. The combustible gas mixture G comprises fuel and an oxidant. The fuel supplied to the submerged burner(s) 120 is preferably methane or propane, and the oxidant may be pure oxygen or include a high-percentage (>80 vol %) of oxygen, in which case the burner(s) 120 are oxy-fuel burners, or it may be air or any oxygen-enriched gas. Upon being injected into the glass melt 92, the combustible gas mixture G immediately autoignites to produce combustion products 126—namely, $CO_2$, CO, $H_2O$, and any uncombusted fuel, oxygen, and/or other gas compounds such as nitrogen—that are discharged into and through the glass melt 92. Anywhere from five to thirty submerged burners 120 are typically installed in the SC melter 14 although more or less burners 120 may be employed depending on the size and melt capacity of the melter 14.

During operation of the SC melter 14, each of the one or more submerged burners 120 individually discharges combustion products 126 directly into and through the glass melt 92. The glass melt 92 is a volume of molten glass that often weighs between 1 US ton (1 US ton=2,000 lbs) and 20 US tons and is generally maintained at a constant volume during steady-state operation of the SC melter 14. As the combustion products 126 are thrust into and through the glass melt 92, which create complex flow patterns and severe turbulence, the glass melt 92 is vigorously agitated and experiences rapid heat transfer and intense shearing forces. The combustion products 126 eventually escape the glass melt 92 and are removed from the interior reaction chamber 98 through the exhaust vent 114 along with any other gaseous compounds that may volatize out of the glass melt 92. Additionally, in some circumstances, one or more non-submerged burners (not shown) may be mounted in the roof 100 and/or the surrounding upstanding wall 104 at a location above the glass melt 92 to provide heat to the glass melt 92, either directly by flame impingement or indirectly through radiant heat transfer, and to also facilitate foam suppression and/or destruction.

While the one or more submerged burners 120 are being fired into the glass melt 92, the vitrifiable feed material 90 is controllably introduced into the interior reaction chamber 98 through the feed material inlet 110. Unlike a conventional glass-melting furnace, the vitrifiable feed material 90 does not form a batch blanket that rests on top of the glass melt 92; rather, the vitrifiable feed material 90 is rapidly disbanded and consumed by the agitated glass melt 92. The dispersed vitrifiable feed material 90 is subjected to intense heat transfer and rapid particle dissolution throughout the glass melt 92 due to the vigorous melt agitation and shearing forces induced by the direct injection of the combustion products 126 from the submerged burner(s) 120. This causes the vitrifiable feed material 90 to quickly mix, react, and become chemically integrated into the glass melt 92. However, the agitation and stirring of the glass melt 92 by the direct discharge of the combustion products 126 also promotes bubble formation within the glass melt 92. Consequently, the glass melt 92 is foamy in nature and includes a homogeneous distribution of entrained gas bubbles. The entrained gas bubbles may account for 30 vol % to 60 vol % of the glass melt 92, which renders the density of the glass melt 92 relatively low, typically ranging from 0.75 $gm/cm^3$ to 1.5 $gm/cm^3$, or more narrowly from 0.99 $gm/cm^3$ to 1.3 $gm/cm^3$, for soda-lime-silica glass. The gas bubbles entrained within the glass melt 92 vary in size and may contain any of several gases including $CO_2$, $H_2O$ (vapor), N2, $SO_2$, CH4, CO, and volatile organic compounds (VOCs).

The vitrifiable feed material 90 introduced into the interior reaction chamber 98 has a composition that is formulated to provide the glass melt 92, particularly at the molten glass outlet 112, with a predetermined glass chemical composition upon melting. For example, the glass chemical composition of the glass melt 92 may be a soda-lime-silica glass chemical composition, in which case the vitrifiable feed material 90 may be a physical mixture of virgin raw materials and optionally cullet (i.e., recycled glass) and/or other glass precursors that provides a source of $SiO_2$, $Na_2O$, and CaO in the correct proportions along with any of the other materials listed below in Table 2 including, most commonly, $Al_2O_3$. The exact materials that constitute the vitrifiable feed material 90 are subject to much variation while still being able to achieve the soda-lime-silica glass chemical composition as is generally well known in the glass manufacturing industry.

TABLE 2

Glass Chemical Composition of Soda-Lime-Silica Glass

| Component | Weight % | Raw Material Sources |
|---|---|---|
| $SiO_2$ | 60-80 | Quartz sand |
| $Na_2O$ | 8-18 | Soda ash |
| CaO | 5-15 | Limestone |
| $Al_2O_3$ | 0-2 | Nepheline Syenite, Feldspar |
| MgO | 0-5 | Magnesite |
| $K_2O$ | 0-3 | Potash |
| $Fe_2O_3$ + FeO | 0-0.08 | Iron is a contaminant |
| $MnO_2$ | 0-0.3 | Manganese Dioxide |
| $SO_3$ | 0-0.5 | Salt Cake, Slag |
| Se | 0-0.0005 | Selenium |
| F | 0-0.5 | Fluorines are a contaminant |

For example, to achieve a soda-lime-silica glass chemical composition in the glass melt 92, the vitrifiable feed material 90 may include primary virgin raw materials such as quartz sand (crystalline $SiO_2$), soda ash ($Na_2CO_3$), and limestone ($CaCO_3$) in the quantities needed to provide the requisite proportions of $SiO_2$, $Na_2O$, and CaO, respectively. Other virgin raw materials may also be included in the vitrifiable feed material 90 to contribute one or more of $SiO_2$, $Na_2O$, CaO and possibly other oxide and/or non-oxide materials in the glass melt 92 depending on the desired chemistry of the soda-lime-silica glass chemical composition and the color of the glass articles being formed. These other virgin raw materials may include feldspar, dolomite, and calumite slag. The vitrifiable feed material 90 may even include up to 80 wt % cullet depending on a variety of factors. Additionally, the vitrifiable feed material 90 may include secondary or minor virgin raw materials that provide the soda-lime-silica glass chemical composition with colorants, decolorants, and/or redox agents that may be needed, as well as fining agents if such agents are desired to be introduced into the glass melt 92 to complement the fining agents introduced into the molten glass bath 22 within the carrier gas 68.

Referring now to FIGS. 1, 3, and 5-7, the foamy molten glass 94 discharged from the SC melter 14 through the molten glass outlet 112 is removed from the glass melt 92 and is chemically homogenized to the desired glass chemical composition, e.g., a soda-lime-silica glass chemical composition, but with the same relatively low density and entrained volume of gas bubbles as the glass melt 92. The foamy molten glass 94 flows into the fining vessel 10 as the input molten glass 12 either directly or through an intermediate stilling or holding tank that may settle and moderate the flow rate of the input molten glass 12. The input molten glass 12 is introduced into the fining chamber 20 through the inlet 24 and combines with and is subsumed by the molten glass bath 22. The blending of the input molten glass 12 with the molten glass bath 22 introduces the gas bubbles 82 into the glass bath 22. These gas bubbles 82 are removed from the molten glass bath 22 as the glass bath 22 flows in the flow direction F from the inlet 24 of the fining vessel 10 to the outlet 26.

As the molten glass bath 22 flows in the flow direction F, the undercurrent 62 of the glass bath 22 flows beneath the skimmer 50 through the submerged passageway 60 to navigate molten glass past the skimmer 50. The undercurrent 62 is selectively and directly exposed to the fining agent(s) that are introduced into the undercurrent 62 from the carrier gas 68, which, in this particular embodiment, produces a rising row of carrier gas effervescence upon being dispensed into the molten glass bath 22. The fining agent(s) react with the molten glass to release fining gases into the undercurrent 62 and the portion of the molten glass bath 22 downstream of the skimmer 50. These fining gases remove the gas bubbles 82 that pass through the submerged passageway 60 by accelerating the ascension of the gas bubbles 82 or causing the gas within the bubbles 82 to dissolve into the glass matrix of the molten glass bath 22. In that regard, the skimmer 50 may be used to separate the entrained gas bubbles 82 introduced into the molten glass bath 22 as discussed above to ensure that most of the gas bubbles 82 that pass beneath the skimmer 50 are smaller gas bubbles having a diameter of 0.7 mm or less or, more preferably, 0.5 mm or less. As a result, the density of the molten glass bath 22 increases along the flow direction F of the glass bath 22, and the amount of the fining agent(s) introduced into the molten glass bath 22 may be limited to what is needed to effectively remove the smaller gas bubbles that pass beneath the skimmer 50.

The output molten glass 16 is removed from the outlet 26 of the fining vessel 10 and has a second density and a second concentration of entrained gas bubbles. The second density of the output molten glass 16 is greater than the first density of the input molten glass 12, and the second concentration of entrained gas bubbles of the output molten glass 16 is less than the first concentration of entrained gas bubbles of the input molten glass 12. For instance, the output molten glass 16 may have a density of 2.3 $gm/cm^3$ to 2.5 $gm/cm^3$ and a concentration of entrained gas bubbles ranging from 0 vol % to 1 vol % or, more narrowly, from 0 vol % to 0.05 vol %, for soda-lime-silica glass. The output molten glass 16 may then be further processed into a glass article such as a glass container. To that end, the output molten glass 16 delivered from the outlet 26 of the fining vessel 10 may have a soda-lime-silica glass chemical composition as dictated by the formulation of the vitrifiable feed material 90, and a preferred process 150 for forming glass containers from the output molten glass 16 includes a thermal conditioning step 152 and a glass article forming step 154, as illustrated in FIG. 8.

In the thermal conditioning step 152, the output molten glass 16 delivered from the fining vessel 10 is thermally conditioned. This involves cooling the output molten glass 16 at a controlled rate to achieve a glass viscosity suitable for glass forming operations while also achieving a more uniform temperature profile within the output molten glass 16. The output molten glass 16 is preferably cooled to a temperature between 1000° C. and 1200° C. to provide conditioned molten glass. The thermal conditioning of the output molten glass 16 may be performed in a separate forehearth that receives the output molten glass 16 from the outlet 26 of the fining vessel 10. A forehearth is an elongated structure that defines an extended channel along which overhead and/or sidewall mounted burners can consistently and smoothly reduce the temperature of the flowing molten glass. In another embodiment, however, the thermal conditioning of the output molten glass 16 may be performed within the fining vessel 10 at the same time the molten glass bath 22 is being fined. That is, the fining and thermal conditioning steps may be performed simultaneously such that the output molten glass 16 is already thermally conditioned upon exiting the fining vessel 10.

Glass containers are formed from the conditioned molten glass in the glass article forming step 154. In some standard container-forming processes, the conditioned molten glass is discharged from the spout 38 at the end of the fining vessel 10 or a similar device at the end of a forehearth as molten glass streams or runners. The molten glass runners are then sheared into individual gobs of a predetermined weight. Each gob is delivered via a gob delivery system into a blank mold of a glass container forming machine. In other glass container forming processes, however, molten glass is streamed directly from the outlet 26 of the fining vessel 10 or an outlet of the forehearth into the blank mold to fill the mold with glass. Once in the blank mold, and with its temperature still between 1000° C. and 1200° C., the molten glass gob is pressed or blown into a parison or preform that includes a tubular wall. The parison is then transferred from the blank mold into a blow mold of the glass container forming machine for final shaping into a container. Once the parison is received in the blow mold, the blow mold is closed and the parison is rapidly outwardly blown into the final container shape that matches the contour of the mold cavity using a compressed gas such as compressed air. Other approaches may of course be implemented to form the glass containers besides the press-and-blow and blow-and-blow forming techniques including, for instance, compression or other molding techniques.

The final container formed within the blow mold has an axially closed base and a circumferential wall. The circumferential wall extends from the axially closed base to a mouth that defines an opening to a containment space defined by the axially closed base and the circumferential wall. The glass container is allowed to cool while in contact with the mold walls of the blow mold and is then removed from the blow mold and placed on a conveyor or other transport device. The glass container is then reheated and cooled at a controlled rate in an annealing lehr to relax thermally-induced constraints and remove internal stress points. The annealing of the glass container involves heating the glass container to a temperature above the annealing point of the soda-lime-silica glass chemical composition, which usually lies within the range of 510° C. to 550° C., followed by slowly cooling the container at a rate of 1° C./min to 10° C./min to a temperature below the strain point of the soda-lime-silica glass chemical composition, which typically lies within the range of 470° C. to 500° C. The glass container may be cooled rapidly after it has been cooled to a temperature below the strain point. Any of a variety of coatings may be applied to the surface of the glass container either before (hot-end coatings) or after (cold-end coatings) annealing for a variety of reasons.

Figures 2, 3:
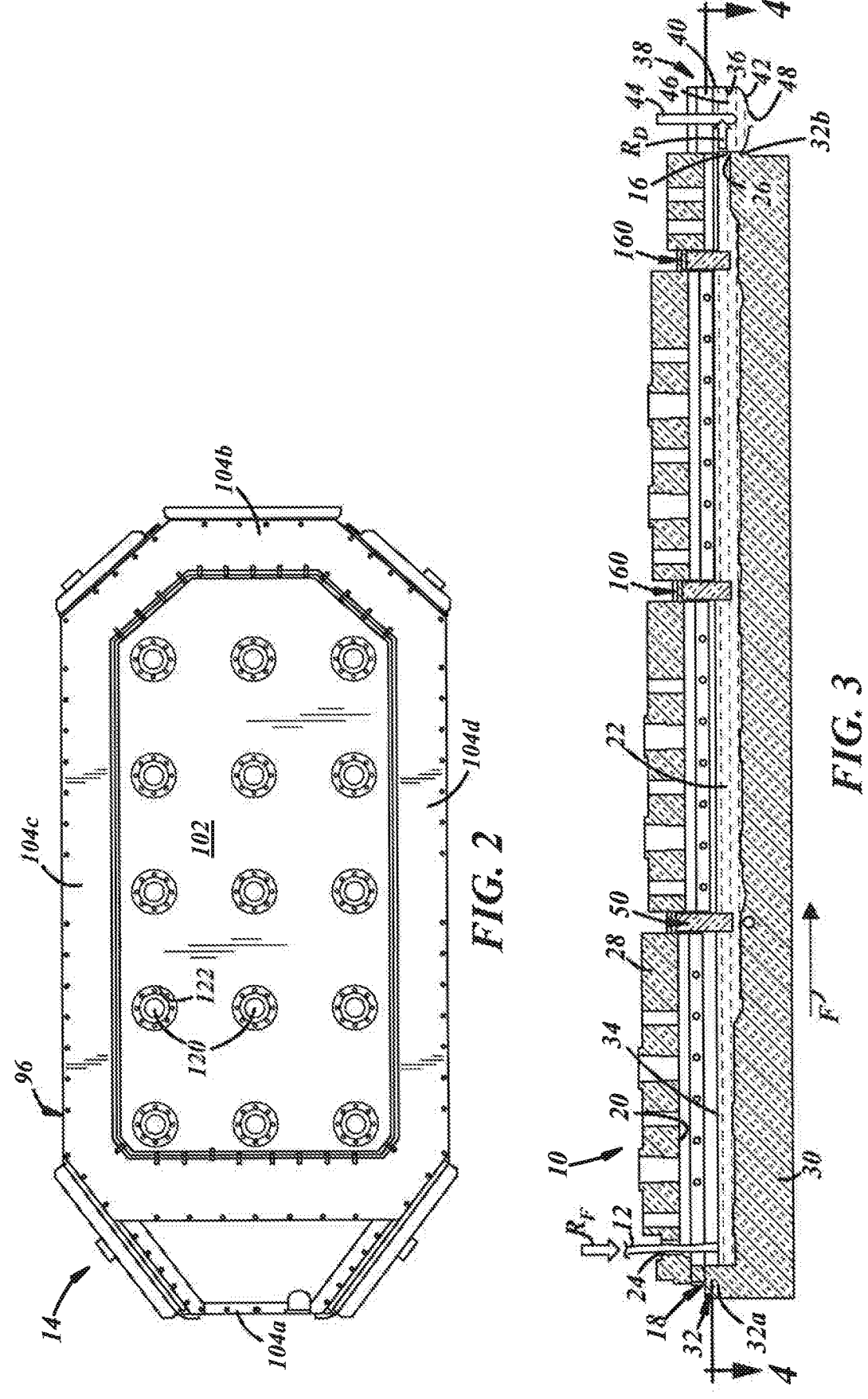
FIG. 2 is a cross-sectional plan view of the floor of the submerged combustion melter illustrated in FIG. 1 and taken along section line 2-2.
FIG. 3 is an elevated cross-sectional illustration of the fining vessel depicted in FIG. 1 according to one embodiment of the present disclosure.

The glass melting, fining, and glass article forming processes described above are subject to variations without detracting from their purposes or objectives. For example, as shown in FIGS. 3-4, one or more skimmers 160 formed of a refractory material may additionally be included in the fining vessel 10 downstream of the skimmer 50 described above. Each of the additional skimmers 160 may individually be the same type of skimmer as described above in that a carrier gas that includes suspended particles of one or more fining agents may be introduced directly beneath the additional skimmer 160. Alternatively, each of the additional skimmers 160 may be a conventional skimmer that is simply submerged partially into the molten glass bath 22 without any carrier gas and suspended fining agent particles being introduced into the glass bath 22 from below. If additional skimmers 160 are included in the fining vessel 10, in many instances the number of additional skimmers 160 will be somewhere between one and three.

There thus has been disclosed a method of fining glass that satisfies one or more of the objects and aims previously set forth. After being fined, the molten glass may be further processed into glass articles including, for example, glass containers. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of fining glass, the method comprising:
supplying input molten glass into a fining chamber of a fining vessel, the input molten glass combining with a molten glass bath contained within the fining chamber and introducing entrained gas bubbles into the molten glass bath, the input molten glass having a density and a concentration of gas bubbles;
flowing the molten glass bath through the fining chamber in a flow direction, the molten glass bath having an undercurrent that flows beneath a skimmer, which is partially submerged in the molten glass bath, and through a submerged passageway defined in part by the skimmer; and
introducing a carrier gas into the undercurrent of the molten glass bath directly beneath the skimmer, the carrier gas comprising suspended particles of one or more fining agents.

2. The method set forth in claim 1, wherein the carrier gas includes a main gas that supports the suspended particles of the one or more fining agents.

3. The method set forth in claim 2, wherein the main gas is air or nitrogen.

4. The method set forth in claim 1, wherein the one or more fining agents includes a sulfate that decomposes to release $O_2$ and $SO_2$ fining gases.

5. The method set forth in claim 1, wherein the one or more fining agents includes sodium sulfate, $Cr_2O_3$, $WO_3$, carbon, aluminum, a carbonate, silicon carbide, oxidized metal powder, or combinations thereof.

6. The method set forth in claim 1, wherein the fining vessel includes a housing that defines the fining chamber, and wherein the carrier gas is introduced into the molten glass bath from a plurality of nozzles that are supported within a floor of the housing.

7. The method set forth in claim 6, wherein the plurality of nozzles are spaced apart along a width of the fining chamber beneath the skimmer to provide a row of carrier gas effervescence that extends transverse to the flow direction of the molten glass bath and rises upwards from the floor of the housing.

8. The method set forth in claim 1, wherein the input molten glass has a soda-lime-silica glass chemical composition.

9. The method set forth in claim 1, further comprising:
discharging output molten glass from the fining vessel, the output molten glass having a density that is greater than the density of the input molten glass and further having a concentration of gas bubbles that is less than the concentration of gas bubbles of the input molten glass.

10. A method of producing and fining glass, the method comprising:

discharging combustion products from one or more submerged burners directly into a glass melt contained within an interior reaction chamber of a submerged combustion melter, the combustion products discharged from the one or more submerged burners agitating the glass melt;

discharging foamy molten glass obtained from the glass melt out of the submerged combustion melter;

supplying the foamy molten glass into a fining chamber of a fining vessel as input molten glass, the input molten glass combining with a molten glass bath contained within the fining chamber and introducing entrained gas bubbles into the molten glass bath, the input molten glass having a density and comprising up to 60 vol % bubbles;

flowing the molten glass bath through the fining chamber in a flow direction, the molten glass bath having an undercurrent that flows beneath a skimmer, which is partially submerged in the molten glass bath, and through a submerged passageway defined in part by the skimmer;

introducing a carrier gas into the undercurrent of the molten glass bath directly beneath the skimmer, the carrier gas comprising suspended particles of one or more fining agents; and discharging output molten glass from the fining vessel, the output molten glass having a density that is greater than the density of the input molten glass.

11. The method set forth in claim 10, wherein the carrier gas includes a main gas that supports the suspended particles of the one or more fining agents.

12. The method set forth in claim 11, wherein the main gas is air or nitrogen, and the one or more fining agents includes sulfate particles suspended in the main gas.

13. The method set forth in claim 10, wherein the one or more fining agents includes sodium sulfate, $Cr_2O_3$, $WO_3$, carbon, aluminum, a carbonate, silicon carbide, oxidized metal powder, or combinations thereof.

14. The method set forth in claim 10, wherein the glass melt in the submerged combustion melter and the molten glass bath in the fining vessel have a soda-lime-silica glass chemical composition.

15. The method set forth in claim 14, further comprising:

forming the output molten glass discharged from the fining vessel into at least one glass container having an axially closed base and a circumferential wall, the circumferential wall extending from the axially closed base to a mouth that defines an opening to a containment space defined by the axially closed base and the circumferential wall.

16. A fining vessel for fining glass, the fining vessel comprising:

a housing that defines a fining chamber, the housing having a roof, a floor, and an upstanding wall that connects the roof and the floor, the housing further defining an inlet to the fining chamber and an outlet from the fining chamber;

a skimmer extending downwards from the roof of the housing towards the floor of the housing and further extending across the fining chamber between opposed lateral sidewalls of the upstanding wall, the skimmer having a distal free end that together with corresponding portions of the floor and upstanding wall defines a submerged passageway; and a plurality of nozzles supported in the floor of the housing directly beneath the skimmer, each of the nozzles being configured to dispense a carrier gas into the fining chamber directly beneath the skimmer, the carrier gas including a main gas that contains suspended particles of one or more fining agents.

17. The fining vessel set forth in claim 16, wherein the plurality of nozzles are spaced apart along a width of the fining chamber beneath the skimmer.

18. The fining vessel set forth in claim 17, wherein the plurality of nozzles are contained within a refractory support block that is received in a channel defined in the floor of the housing, wherein the channel extends across the width of the fining chamber.

19. The fining vessel set forth in claim 18, wherein the refractory support block is slidably received within the channel.

20. The fining vessel set forth in claim 18, wherein each of the plurality of nozzles further includes a feeder line, and wherein the refractory support block also contains a carrier gas supply conduit that fluidly communicates with the feeder line of each of the plurality of nozzles such that the carrier gas is supplied to the plurality of nozzles from the carrier gas supply conduit.

* * * * *